United States Patent
Brooks et al.

(10) Patent No.: US 11,181,046 B1
(45) Date of Patent: Nov. 23, 2021

(54) HIGH SPEED SHAFT FLEXIBLE COUPLING

(71) Applicant: Florida Turbine Technologies, Inc., Jupiter, FL (US)

(72) Inventors: Stephen M Brooks, Jupiter, FL (US); Alex Pinera, Jupiter, FL (US)

(73) Assignee: FLORIDA TURBINE TECHNOLOGIES, INC., Jupiter, FL (US)

( * ) Notice: Subject to any disclaimer, the term of this patent is extended or adjusted under 35 U.S.C. 154(b) by 98 days.

(21) Appl. No.: 16/566,434

(22) Filed: Sep. 10, 2019

(51) Int. Cl.
*F02C 7/36* (2006.01)
*F16D 3/06* (2006.01)

(52) U.S. Cl.
CPC ............... *F02C 7/36* (2013.01); *F16D 3/06* (2013.01); *F05D 2220/32* (2013.01); *F05D 2240/62* (2013.01)

(58) Field of Classification Search
CPC .......... F02C 7/36; F16D 3/06; F05D 2240/62; F05D 2220/32
See application file for complete search history.

(56) References Cited

U.S. PATENT DOCUMENTS

| | | | | |
|---|---|---|---|---|
| 4,987,795 | A * | 1/1991 | Nguyen | F16H 57/027 464/170 |
| 2010/0113170 | A1* | 5/2010 | Schreiber | F16C 3/026 464/181 |
| 2017/0175753 | A1* | 6/2017 | Tan-Kim | F01D 21/045 |
| 2018/0274369 | A1* | 9/2018 | Clum | F01D 5/187 |
| 2019/0031319 | A1* | 1/2019 | Calkins | B64C 11/40 |

* cited by examiner

*Primary Examiner* — Jacob M Amick
*Assistant Examiner* — Charles J Brauch
(74) *Attorney, Agent, or Firm* — Katherine Koenig; Koenig IP Works, PLLC

(57) ABSTRACT

A gas turbine engine in which a long length-to-diameter (L/D) flexible shaft is used to connect two high speed shafts in order to tolerate misalignment. In order to reduce the overall system length, a smaller diameter flexible shaft is contained within but not in contact with a larger diameter primary turbomachinery shaft such that the smaller flexible shaft adjoins to the primary shaft aft of the primary shaft bearing. This design reduces a length of the overall system and reduces additional cost associated with a flex bellows or spline.

9 Claims, 2 Drawing Sheets

HIGH SPEED SHAFT FLEXIBLE COUPLING

GOVERNMENT LICENSE RIGHTS

This invention was made with Government support under contract number D17PC00072 awarded by the Department-of-Defense (DoD) Agency—Defense Advanced Research Projects Agency (DARPA). Distribution Statement "A" (Approved for Public Release, Distribution Unlimited). The Government has certain rights in the invention.

CROSS-REFERENCE TO RELATED APPLICATIONS

None.

BACKGROUND OF THE INVENTION

Field of the Invention

The present invention relates generally to a small gas turbine engine and more specifically to a high speed shaft coupling that permits misalignment between two adjoining shafts.

Description of the Related Art Including Information Disclosed Under 37 CFR 1.97 and 1.98

A gas turbine engine used to power an aircraft includes a fan that produces a core flow and a bypass flow. A flexible coupling between the high speed shaft of the gas turbine and the shaft of the load (generator, alternator, fan, compressor, etc.) is required to accommodate misalignment resulting from manufacturing and assembly tolerances or maneuver deflections. Such misalignment can cause excessive loads in the shafts and/or bearings and lead to premature distress or failure. Methods of achieving a flexible coupling between the primary shafts have been identified in the prior art. The TFE731 Turbofan engine made by Honeywell Aerospace appears to utilize a shaft coupling with a pair of working splines to achieve misalignment capability. Other manufacturers use a flexible coupling based on a bellows interface between two shafts.

BRIEF SUMMARY OF THE INVENTION

A gas turbine engine in which a flexible shaft having a long length, L, relative to diameter, D, (L/D) is used to connect two high speed shafts in order to tolerate misalignment. To reduce the overall system length, a smaller diameter flexible shaft is contained within but not in contact with a larger diameter primary turbomachinery shaft such that the smaller flexible shaft adjoins to the primary shaft within the larger diameter shaft and aft of the primary shaft bearing. This design reduces a length of the overall system and reduces additional cost associated with a flexible bellows or spline coupling.

DETAILED DESCRIPTION OF THE INVENTION

The present invention is a high speed shaft flexible coupling between the gas turbine shaft and a secondary shaft. The secondary shaft could be connected to a load such as a fan, a gearbox, an alternator, or a fan or a second compressor. The flexible shaft coupling is comprised of a small diameter flexible shaft that is connected inside a hollow portion of a larger diameter primary shaft using a torque transfer feature situated at the end of the flexible shaft. The smaller diameter flexible shaft is contained within but otherwise not in contact with the larger diameter primary shaft except at the torque transfer feature. The small diameter flexible shaft is driven by the larger diameter primary shaft. This design reduces a length of the overall system and reduces additional cost associated with a flexible bellows or spline coupling.

Figure 1:
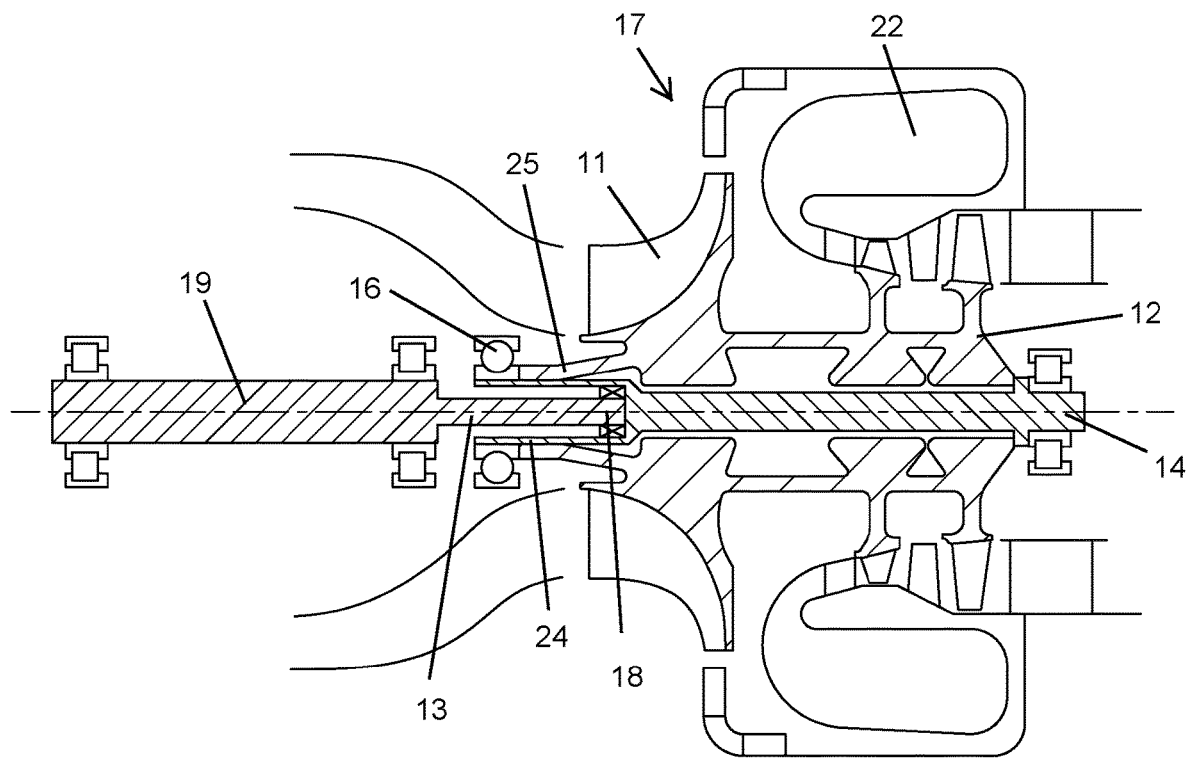
FIG. 1 shows a cross section view of the high speed shaft flexible coupling connecting high speed shafts of the present invention.

FIG. 1 shows a cross section of the high speed shaft flexible coupling in which a gas turbine engine 17 includes a compressor 11, a turbine 12, a combustor 22, a long length-to-diameter (L/D) flexible shaft 13 and a high speed shaft 14 that is connected to the compressor 11 and turbine 12. In this embodiment, the compressor 11 is shown as a centrifugal compressor and the turbine 12 is shown as an axial turbine, but those familiar with the art recognize the compressor 11 and the turbine 12 could be of either centrifugal or axial form. A primary shaft bearing 16 rotatably supports a forward end of the high speed shaft 14. The flexible shaft 13 has a smaller diameter than does the high speed shaft 14 and thus shaft 13 can be referred to as the smaller diameter flexible shaft 13 while shaft 14 can be referred to as the larger diameter high speed shaft 14. The smaller diameter flexible shaft 13 is connected to the high speed shaft 14 through a torque transfer feature 26 (FIG. 2) such as a spline or keyway. Other mechanisms may be used to transfer the torque including a hex-drive or square-drive or press-fitting of the smaller diameter flexible shaft 13 into the larger diameter high speed shaft 14. The smaller diameter flexible shaft 13 extends from a larger diameter section 19 to form a single piece shaft with two different diameters. The smaller diameter flexible shaft 13 does not make contact with the inner surface of the high speed shaft 14 except for the end where the torque transfer feature 26 is located. The compressor 11, turbine 12 and high speed shaft 14 all form the rotor system and rotate together. In this figure, the combustor 22 is shown as a reverse-flow type, but other combustors, such as cans, can-annular, or full annular types may also be used.

The smaller diameter flexible shaft 13 has a smaller diameter relative to the larger diameter high speed shaft 14 and fits inside a hollow extension 25 of the larger diameter high speed shaft 14. The smaller diameter flexible shaft 13 allows for the flexibility between the driven end and the driving end. The larger diameter high speed shaft 14 and rotor system have sufficient stiffness to support the compressor 11 and turbine 12 while maintaining deflection of the rotor system within prescribed limits.

Figure 2:
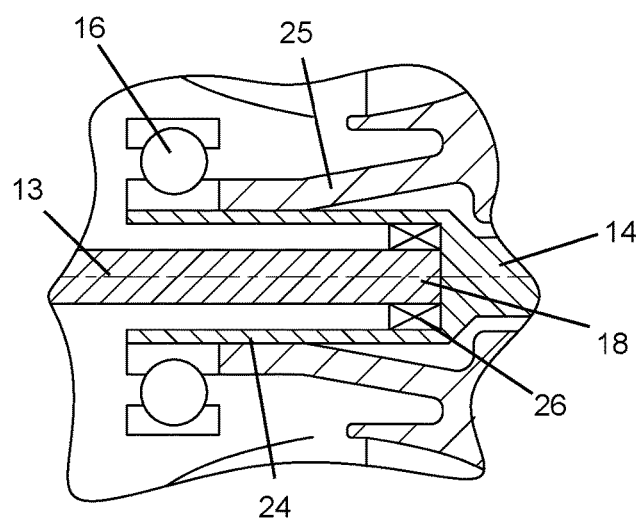
FIG. 2 shows a close-up view of the high speed shaft flexible coupling of FIG. 1.

FIG. 2 shows an enlarged section of the flexible coupling used in the FIG. 1 embodiment. The flexible shaft 13 includes one end 18 that abuts a bottom surface of the hollow section of the high speed shaft 14 as seen in FIG. 2. The torque transfer feature 26 is also located at the bottom of the hollow section 24 of the high speed shaft 14. The hollow section 24 of the high speed shaft 14 fits within a hollow extension 25 of the rotor of compressor 11. The torque transfer feature 26 such as a spline or keyway connects the end of the smaller diameter flexible shaft 18 to the bottom of the hollow section 24 of the larger diameter high speed shaft 14 to transmit torque between these two shafts.

Figure 3:
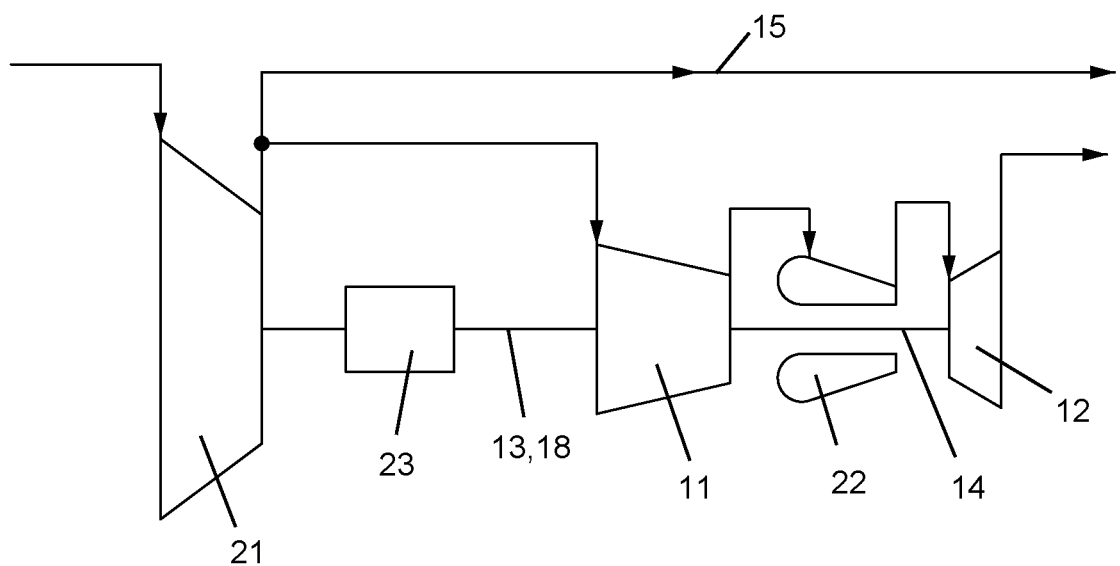
FIG. 3 shows a schematic diagram of a turbofan gas turbine engine that uses the high speed shaft flexible coupling of the present invention.

FIG. 3 shows a diagram view of one application of the present invention comprised of a geared turbofan engine using the flexible coupling (13, 18) of the present invention. The geared turbofan engine includes a compressor 11 and turbine 12 connected together with the larger diameter high speed shaft 14, a combustor 22, a speed reduction gearbox 23 such as a planetary gear set, and a fan 21. A planetary gear set contains a sun gear that is surrounded by one or more planetary gears. Bypass flow 15 from the fan 21 passes around the core of the gas turbine engine. In this embodiment, the flexible coupling 13 and 18 of FIG. 1 is shown connected between the speed reduction gearbox 23 and the compressor 11. In the geared turbofan engine of the present invention, no low pressure turbine is used. The turbine 12 drives both the compressor 11 and the fan 21. The fan 21 produces both the bypass flow 15 and the core flow that enters the compressor 11.

The smaller diameter flexible shaft 13 is connected to the larger diameter high speed shaft 14 aft of the primary shaft bearing 16. This design reduces the length of the overall system and reduces additional cost associated with the flexible bellows or splines of the prior art flexible couplings in a geared turbofan engine.

The invention claimed is:

1. A gas turbine engine comprising:
 a larger diameter high speed shaft connecting a compressor to a turbine, the larger diameter high speed shaft including a hollow section at a forward end of the larger diameter high speed shaft, the hollow section having a bottom at an aft end of the hollow section;
 a combustor to produce a hot gas stream to drive the turbine;
 a smaller diameter flexible shaft, the smaller diameter flexible shaft having a smaller diameter than a diameter of the larger diameter high speed shaft;
 a load driven by the larger diameter high speed shaft and connected to the smaller diameter flexible shaft; and
 a flexible coupling connected between the smaller diameter flexible shaft and the larger diameter high speed shaft, wherein at least a portion of the smaller diameter flexible shaft is positioned within the hollow section of the larger diameter high speed shaft, the flexible coupling including a torque transfer feature, a first portion of the torque transfer feature being located at an aft end of the smaller diameter flexible shaft and a second portion of the torque transfer feature being located at the bottom of the hollow section of the larger diameter high speed shaft, the first portion of the torque transfer feature being mateably engageable with the second portion of the torque transfer feature.

2. The gas turbine engine of claim 1, and further comprising:
 a primary shaft bearing to support the larger diameter high speed shaft at a location forward of the torque transfer feature between the smaller diameter flexible shaft and the larger diameter high speed shaft.

3. The gas turbine engine of claim 1, wherein the smaller diameter flexible shaft makes no contact with the larger diameter high speed shaft except for a mateable engagement between the first portion of the torque transfer feature at the aft end of the smaller diameter flexible shaft and the second portion of the torque transfer feature at the bottom of the hollow section of the larger diameter high speed shaft.

4. The gas turbine engine of claim 1, and further comprising a speed reduction gear box, the speed reduction gear box being a planetary gear set with a sun gear connected to a forward end of the smaller diameter flexible shaft.

5. The gas turbine engine of claim 1, wherein the load is a fan, the gas turbine engine being without a low pressure turbine rotatably connected to the fan.

6. The gas turbine engine of claim 1, wherein the combustor is a reverse-flow type with a turn channel to pass the hot gas stream into the turbine which is an axial flow turbine.

7. The gas turbine engine of claim 1, wherein:
 the smaller diameter flexible shaft is flexible to allow for flexing between an input end and an output end; and
 the larger diameter high speed shaft is a relatively stiff shaft to support the compressor without flexing.

8. The gas turbine engine of claim 1, wherein the load is a generator or an alternator or a fan or a second compressor.

9. The gas turbine engine of claim 1, wherein the gas turbine engine is a geared turbofan gas turbine engine.

* * * * *